July 1, 1924.
J. R. WHITAKER
HOLDER
Filed April 8, 1922
1,500,018
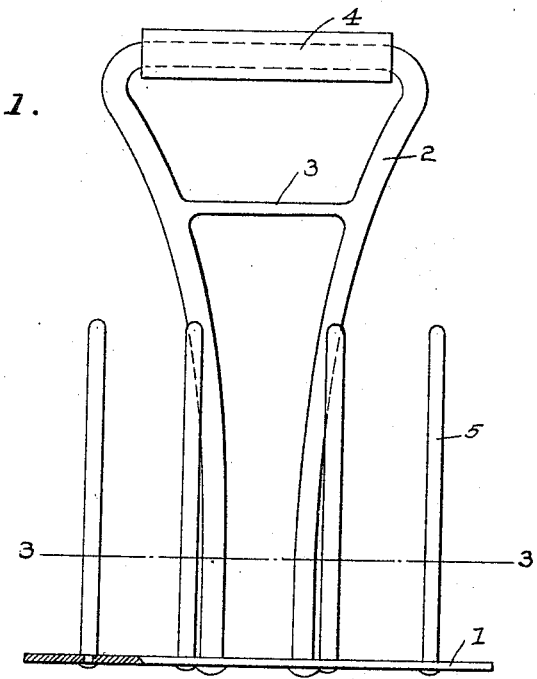
Fig. 1.
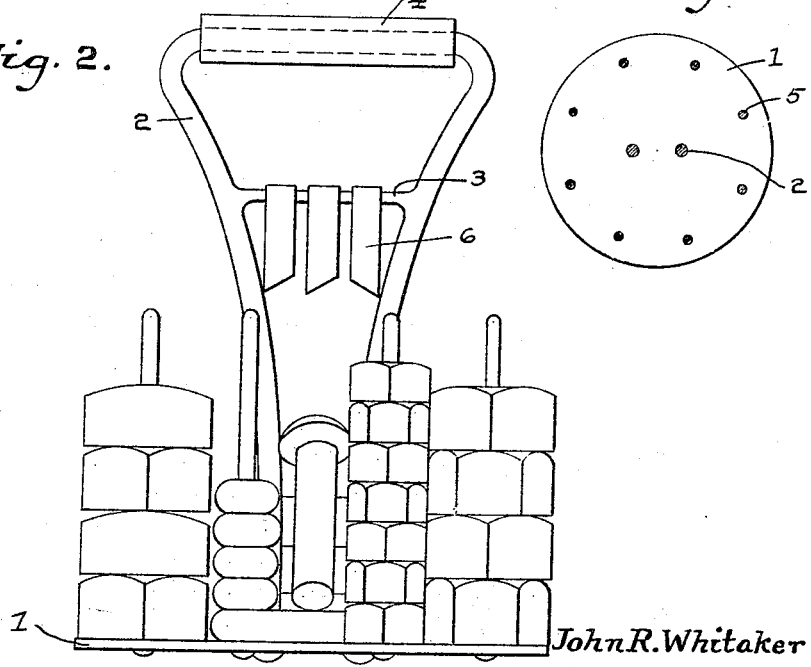
Fig. 2.
Fig. 3.
John R. Whitaker
INVENTOR
BY Victor J. Evans
ATTORNEY
WITNESS:

Patented July 1, 1924.

1,500,018

UNITED STATES PATENT OFFICE.

JOHN R. WHITAKER, OF NORTON, VIRGINIA.

HOLDER.

Application filed April 8, 1922. Serial No. 550,747.

*To all whom it may concern:*

Be it known that I, JOHN R. WHITAKER, a citizen of the United States, residing at Norton, in the county of Wise and State of Virginia, have invented new and useful Improvements in Holders, of which the following is a specification.

The object of this invention is to provide a device for carrying nuts, cotter pins and the like to the place where repairs are to be made or the parts used.

Another object of the invention is to so form the parts that the nuts can be held with the different sizes separated so that the workman can easily find the size he desires.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1 is a view of the device in empty condition.

Figure 2 is a view with the nuts and other parts thereon.

Figure 3 is a sectional view taken on the line 3—3 of Figure 1.

As shown in these views the device comprises a plate 1 to which the ends of a substantially U-shaped handle 2 is secured. The handle is widened out at its upper end and is braced by the cross piece 3 and has a tubular part 4 on its bight which forms a hand engaging part. A plurality of upright pieces 5 have their lower ends secured to the plate, these pieces being adapted to receive the nuts, cotter pins, couplings and other material used in repairing machinery or for other purposes. Bolts can be placed between the uprights and strips of material or tools can be placed on the cross brace, as shown at 6. The nuts can be placed on the uprights according to size so that the nuts of the same size will be found on one upright and those of another size on another upright and so on. This will enable the workman to easily pick out the size he desires.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

A device of the class described comprising a base, uprights having their lower ends secured thereto, said uprights being adapted to receive nuts and the like, an inverted U-shaped handle having its ends connected with the central part of the base and a cross piece adjacent the upper end of the handle for bracing the handle and for supporting objects.

In testimony whereof I affix my signature.

JOHN R. WHITAKER.